US012228037B1

(12) United States Patent
Kray et al.

(10) Patent No.: US 12,228,037 B1
(45) Date of Patent: Feb. 18, 2025

(54) GUIDE VANE ASSEMBLY WITH FIXED AND VARIABLE PITCH INLET GUIDE VANES

(71) Applicant: General Electric Company, Schenectady, NY (US)

(72) Inventors: Nicholas Joseph Kray, Mason, OH (US); Brandon Wayne Miller, Liberty Township, OH (US); Gary Willard Bryant, Jr., Loveland, OH (US); Arthur William Sibbach, Boxford, MA (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/527,567

(22) Filed: Dec. 4, 2023

(51) Int. Cl.
*F01D 17/16* (2006.01)
*F01D 9/04* (2006.01)

(52) U.S. Cl.
CPC ............. *F01D 17/16* (2013.01); *F01D 9/041* (2013.01); *F05D 2220/36* (2013.01); *F05D 2240/12* (2013.01)

(58) Field of Classification Search
CPC ...... F01D 17/16; F01D 9/041; F05D 2220/36; F05D 2240/12
See application file for complete search history.

(56) References Cited

U.S. PATENT DOCUMENTS

| | | | |
|---|---|---|---|
| 2,634,581 A | | 4/1953 | Kent |
| 2,663,993 A | | 12/1953 | Mosser |
| 3,533,486 A | | 10/1970 | Paulson |
| 3,540,682 A | | 11/1970 | Dibble et al. |
| 3,575,259 A | | 4/1971 | Wilkinson |
| 3,618,876 A | | 11/1971 | Skidmore et al. |
| 3,664,612 A | | 5/1972 | Skidmore et al. |
| 3,762,835 A | * | 10/1973 | Carlson .................. F01D 5/147 29/889.71 |
| 3,819,008 A | | 6/1974 | Evans et al. |
| 3,861,822 A | | 1/1975 | Wanger |
| 3,981,466 A | | 9/1976 | Shah |
| 4,254,619 A | | 3/1981 | Griffin, III et al. |
| 4,688,745 A | | 8/1987 | Rosenthal |
| 5,010,729 A | | 4/1991 | Adamson et al. |
| 5,230,605 A | * | 7/1993 | Yamaguchi ........... F04D 29/563 415/151 |
| 5,458,457 A | | 10/1995 | Goto et al. |

(Continued)

FOREIGN PATENT DOCUMENTS

| | | |
|---|---|---|
| CN | 101922312 A | 12/2010 |
| FR | 1038694 A | 9/1953 |
| GB | 2403778 A | 1/2005 |

OTHER PUBLICATIONS

Willis, Quiet Clean Short-Haul Experimental Engine (QCSEE) Final Report, NASA-CR-159473, National Aeronautics and Space Administration, Contract NAS3-18021, QCSEE NASA Report NASA-CR-159473, Aug. 1979, 312 Pages.

*Primary Examiner* — Brian Christopher Delrue
(74) *Attorney, Agent, or Firm* — Dority & Manning, P.A.

(57) ABSTRACT

A guide vane assembly for a nacelle of a gas turbine engine includes a forward vane and an aft vane. The aft vane is located aft of the forward vane and forward of a plurality of fan blades. The forward vane defines a fixed pitch angle and the aft vane is movable between a first pitch angle and a second pitch angle.

14 Claims, 5 Drawing Sheets

(56) References Cited

U.S. PATENT DOCUMENTS 5,794,432 A * 8/1998 Dunbar .................. F04D 27/02
60/226.1
5,952,621 A * 9/1999 Curtis .................... F02C 7/045
181/213
6,409,469 B1 6/2002 Tse
6,431,820 B1 8/2002 Beacock et al.
6,457,938 B1 10/2002 Liu et al.
6,508,630 B2 1/2003 Liu et al.
6,540,477 B2 4/2003 Glynn et al.
6,546,734 B2 4/2003 Antoine et al.
6,585,482 B1 7/2003 Liotta et al.
6,619,916 B1 9/2003 Capozzi et al.
6,655,632 B1 12/2003 Gupta et al.
6,834,505 B2 12/2004 Al-Roub et al.
6,935,833 B2 8/2005 Seitz
6,973,193 B1 * 12/2005 Tse ...................... G10K 11/175
181/204
7,025,565 B2 4/2006 Urso et al.
7,055,304 B2 6/2006 Courtot et al.
7,096,657 B2 8/2006 Mahoney et al.
7,210,900 B2 5/2007 Urso et al.
7,246,773 B2 7/2007 Stoner et al.
7,313,963 B2 1/2008 Kuznar
7,374,403 B2 5/2008 Decker et al.
7,374,404 B2 5/2008 Schilling
7,407,364 B2 8/2008 Arnold et al.
7,413,401 B2 8/2008 Szucs et al.
7,575,412 B2 8/2009 Seitz
7,789,620 B2 9/2010 Vontell, Sr. et al.
7,854,778 B2 12/2010 Groom et al.
7,871,244 B2 1/2011 Marini et al.
7,874,137 B2 1/2011 Chaney et al.
7,882,694 B2 2/2011 Suciu et al.
7,926,261 B2 4/2011 Porte
7,942,632 B2 5/2011 Lord et al.
7,955,046 B2 6/2011 McCune et al.
7,963,362 B2 6/2011 Lidoine
8,021,104 B2 9/2011 Gu et al.
8,105,042 B2 1/2012 Parkin et al.
8,186,942 B2 5/2012 Haas
8,226,360 B2 7/2012 Scoggins et al.
8,328,518 B2 12/2012 Liang et al.
8,397,487 B2 3/2013 Sennoun et al.
8,419,374 B2 4/2013 Huth et al.
8,529,188 B2 9/2013 Winter
8,572,943 B1 11/2013 Sheridan
8,579,584 B2 * 11/2013 Brown ..................... F02K 3/06
415/220
8,641,367 B2 2/2014 Norris et al.
8,677,764 B2 3/2014 Porte
8,689,538 B2 4/2014 Sankrithi et al.
8,690,519 B2 4/2014 Aalburg et al.
8,757,959 B2 6/2014 Suciu et al.
8,806,871 B2 8/2014 McMasters et al.
8,943,796 B2 2/2015 McCaffrey
9,003,808 B2 4/2015 Kupratis
9,039,364 B2 5/2015 Alvanos et al.
9,045,991 B2 6/2015 Read et al.
9,068,470 B2 6/2015 Mills et al.
9,074,483 B2 7/2015 Breeze-Stringfellow et al.
9,109,514 B2 8/2015 Cheong
9,114,877 B2 8/2015 Weber et al.
9,140,212 B2 9/2015 Moon et al.
9,206,697 B2 12/2015 Tibbott et al.
9,206,740 B2 12/2015 Wong et al.
9,228,497 B2 1/2016 Ottow et al.
9,239,005 B2 1/2016 Strecker et al.
9,249,736 B2 2/2016 Carroll
9,506,361 B2 11/2016 Fielding et al.
9,523,284 B2 12/2016 Miller et al.
9,540,094 B2 1/2017 Negulescu et al.
9,695,751 B2 7/2017 Kupratis et al.
9,784,134 B2 10/2017 Eleftheriou
9,797,261 B2 10/2017 Tibbott et al.
9,835,092 B2 12/2017 Sawyers-Abbott et al.
9,840,930 B2 12/2017 Lee et al.
9,863,256 B2 1/2018 Lee et al.
9,874,102 B2 1/2018 Azad et al.
9,874,109 B2 1/2018 Hatcher, Jr. et al.
9,879,599 B2 1/2018 Mercier et al.
9,945,247 B2 4/2018 Appukuttan et al.
9,957,918 B2 5/2018 Suciu et al.
9,995,167 B2 6/2018 Shepard
10,018,167 B2 7/2018 Tentorio
10,054,052 B2 8/2018 Zheng et al.
10,060,270 B2 8/2018 Lee et al.
10,060,351 B2 8/2018 Oggero
10,066,508 B2 9/2018 Geiger
10,100,733 B2 10/2018 O'Toole et al.
10,113,444 B2 10/2018 Huang et al.
10,131,443 B2 11/2018 Namgoong
10,145,301 B2 12/2018 Abrari et al.
10,173,780 B2 1/2019 Mackin et al.
10,184,340 B2 1/2019 Baltas et al.
10,189,572 B2 1/2019 Mackin et al.
10,196,895 B2 2/2019 Weinert et al.
10,196,901 B2 2/2019 Wong et al.
10,215,192 B2 2/2019 Griffin
10,239,626 B2 3/2019 Herchenroder et al.
10,240,526 B2 3/2019 Suciu et al.
10,252,790 B2 4/2019 Ramakrishnan
10,260,527 B2 4/2019 Steen
10,273,880 B2 4/2019 Kolvick et al.
10,288,010 B2 5/2019 Houston et al.
10,288,083 B2 5/2019 Miller et al.
10,344,711 B2 7/2019 Hsu
10,371,054 B2 8/2019 Sasse et al.
10,378,554 B2 8/2019 Yu et al.
10,385,871 B2 8/2019 Lurie et al.
10,393,132 B2 8/2019 Lee et al.
10,399,664 B2 9/2019 Bowden et al.
10,415,409 B2 9/2019 Oyarbide
10,436,046 B2 10/2019 Fentem et al.
10,480,328 B2 11/2019 Weaver et al.
10,480,413 B2 11/2019 Snyder
10,502,232 B2 12/2019 Mohtar et al.
10,519,859 B2 12/2019 Marchaj et al.
10,557,415 B2 2/2020 Boudebiza et al.
10,563,513 B2 2/2020 Kalitzin et al.
10,634,059 B2 4/2020 Rami et al.
10,641,178 B2 5/2020 Corrandini et al.
10,690,146 B2 6/2020 Urac et al.
10,695,704 B2 6/2020 Mook et al.
10,711,797 B2 7/2020 Kroger et al.
10,723,476 B2 7/2020 Zaccardi et al.
10,724,395 B2 7/2020 Kupratis et al.
10,724,435 B2 7/2020 Kroger et al.
10,738,694 B1 8/2020 Kupratis et al.
10,787,909 B2 9/2020 Hiernaux
10,794,224 B2 10/2020 Schiessl
10,794,292 B2 10/2020 Kupratis et al.
10,794,395 B2 10/2020 Tamada
10,794,396 B2 10/2020 Kroger et al.
10,801,442 B2 10/2020 Clements et al.
10,815,886 B2 10/2020 Kroger et al.
10,816,208 B2 10/2020 DiCintio et al.
10,822,999 B2 11/2020 Morris et al.
10,823,114 B2 11/2020 Clements et al.
10,830,135 B2 11/2020 Slawinska et al.
10,837,361 B2 11/2020 Abrari et al.
10,883,515 B2 1/2021 Lurie et al.
10,961,864 B2 3/2021 Miranda et al.
11,118,601 B2 9/2021 Yu et al.
11,480,063 B1 10/2022 Miller et al.
11,725,526 B1 * 8/2023 Sibbach .................. F01D 9/041
415/191
2001/0023582 A1 9/2001 Nagel
2007/0201984 A1 * 8/2007 Liston ..................... F01D 5/286
416/230
2008/0041064 A1 2/2008 Moore et al.
2008/0155959 A1 7/2008 Rasheed et al.
2008/0155989 A1 7/2008 Roth
2008/0232963 A1 9/2008 Durocher et al.
2009/0155053 A1 6/2009 Speak

(56) References Cited

U.S. PATENT DOCUMENTS

2009/0155072 A1 6/2009 Winter
2009/0245997 A1 10/2009 Hurwitz et al.
2009/0255116 A1 10/2009 McMasters et al.
2009/0272850 A1 11/2009 Rainous et al.
2009/0277181 A1 11/2009 Druon et al.
2009/0293445 A1 12/2009 Ress, Jr.
2010/0226783 A1* 9/2010 Lipkin .................. C23C 28/322 427/404
2011/0044796 A1 2/2011 Hussain et al.
2012/0240594 A1 9/2012 Shamara
2012/0241561 A1 9/2012 Shamara
2013/0192263 A1 8/2013 Suciu et al.
2013/0319011 A1 12/2013 Pescosolido et al.
2013/0323011 A1 12/2013 Chopra et al.
2014/0020404 A1 1/2014 Sheridan et al.
2014/0208755 A1 7/2014 Ekanayake et al.
2014/0208768 A1 7/2014 Bacic
2014/0318137 A1 10/2014 McMasters et al.
2015/0198050 A1 7/2015 Lee et al.
2015/0198163 A1 7/2015 Lei et al.
2016/0003046 A1 1/2016 Smith et al.
2016/0017751 A1 1/2016 Caruel
2016/0047307 A1 2/2016 Williamson et al.
2016/0047308 A1 2/2016 Williamson et al.
2016/0047309 A1 2/2016 Davidson et al.
2016/0047335 A1 2/2016 Davidson et al.
2016/0084265 A1* 3/2016 Yu ......................... F04D 29/542 415/177
2016/0195010 A1 7/2016 Roberge
2016/0298543 A1 10/2016 Suciu et al.
2017/0030213 A1 2/2017 Vlasic et al.
2017/0082028 A1 3/2017 Duong et al.
2017/0138202 A1 5/2017 Wadia et al.
2017/0146026 A1 5/2017 Griffin
2017/0152019 A1* 6/2017 Wood ...................... B64C 11/18
2017/0191372 A1 7/2017 Tralshawala et al.
2017/0276018 A1 9/2017 Bifulco et al.
2017/0284220 A1 10/2017 Roberge
2017/0292532 A1 10/2017 Wall
2017/0297728 A1 10/2017 Niergarth et al.
2017/0298751 A1 10/2017 Messmann et al.
2017/0314509 A1 11/2017 Laricchiuta et al.
2018/0010617 A1 1/2018 Casavant et al.
2018/0045059 A1 2/2018 Lee et al.
2018/0112546 A1 4/2018 Griffin
2018/0128179 A1 5/2018 Staubach et al.
2018/0135432 A1 5/2018 Martin, Jr. et al.
2018/0138766 A1 5/2018 Moore et al.
2018/0138767 A1 5/2018 Moore et al.
2018/0216527 A1 8/2018 D'Angelo et al.
2018/0223733 A1 8/2018 Zhang et al.
2018/0230944 A1 8/2018 Suciu et al.
2018/0283183 A1 10/2018 Gallier et al.
2018/0334916 A1 11/2018 Lurie et al.
2018/0363554 A1 12/2018 Kroger et al.
2018/0363675 A1 12/2018 Kroger et al.
2018/0363676 A1 12/2018 Kroger et al.
2018/0363677 A1 12/2018 Kroger et al.
2018/0363678 A1 12/2018 Kroger et al.
2019/0010868 A1 1/2019 Davidson et al.
2019/0048798 A1 2/2019 Slawinska et al.
2019/0063243 A1 2/2019 Lemaire
2019/0107119 A1 4/2019 Yu et al.
2019/0226402 A1 7/2019 Kray et al.
2019/0284693 A1 9/2019 Task
2019/0284940 A1 9/2019 Task et al.
2019/0338707 A1 11/2019 Beecroft et al.
2019/0368421 A1 12/2019 Sweidan
2020/0025110 A1 1/2020 Silkowski
2020/0049077 A1 2/2020 Schwarz et al.
2020/0080432 A1 3/2020 Filipenco
2020/0123918 A1 4/2020 Duong et al.
2020/0141277 A1 5/2020 Cooper et al.
2020/0149421 A1 5/2020 Lad
2020/0165938 A1 5/2020 Schreiber et al.
2020/0276641 A1 9/2020 Benard et al.
2020/0284261 A1 9/2020 Merchant et al.
2020/0300174 A1 9/2020 Williamson et al.
2020/0316508 A1 10/2020 Mook et al.
2020/0347737 A1 11/2020 Bordoni
2021/0078715 A1 3/2021 Bevirt et al.
2021/0087948 A1 3/2021 Suciu
2021/0108597 A1 4/2021 Ostdiek et al.
2023/0028503 A1 1/2023 Sibbach et al.
2023/0053554 A1 2/2023 Sibbach et al.
2023/0059995 A1 2/2023 Geertsema et al.
2023/0060010 A1 2/2023 Sibbach et al.
2023/0265862 A1* 8/2023 Sibbach .................. F01D 25/24 415/208.2
2023/0279872 A1 9/2023 Miller et al.
2023/0287837 A1 9/2023 Sibbach et al.

* cited by examiner

GUIDE VANE ASSEMBLY WITH FIXED AND VARIABLE PITCH INLET GUIDE VANES

FIELD

The present disclosure relates to a guide vane assembly, and more particularly to a guide vane assembly for a gas turbine engine configured to guide an airflow at an inlet of a nacelle.

BACKGROUND

A turbofan engine generally includes a fan having a plurality of fan blades and a turbomachine arranged in flow communication with one another. Additionally, the turbomachine of the turbofan engine generally includes, in serial order, a compressor section, a combustion section, a turbine section, and an exhaust section. In operation, air is provided from the fan to an inlet of the compressor section where one or more axial compressors progressively compress the air until the compressed air reaches the combustion section. Fuel is mixed with the compressed air and burned within the combustion section to provide combustion gases. The combustion gases are routed from the combustion section to the turbine section. The flow of combustion gases through the turbine section drives the turbine section and is then routed through the exhaust section, e.g., to atmosphere. Efficiency losses in the fan may result in a less efficient turbofan engine.

BRIEF DESCRIPTION OF THE DRAWINGS

A full and enabling disclosure of the present disclosure, including the best mode thereof, directed to one of ordinary skill in the art, is set forth in the specification, which makes reference to the appended figures, in which.

DETAILED DESCRIPTION

Figure 1:
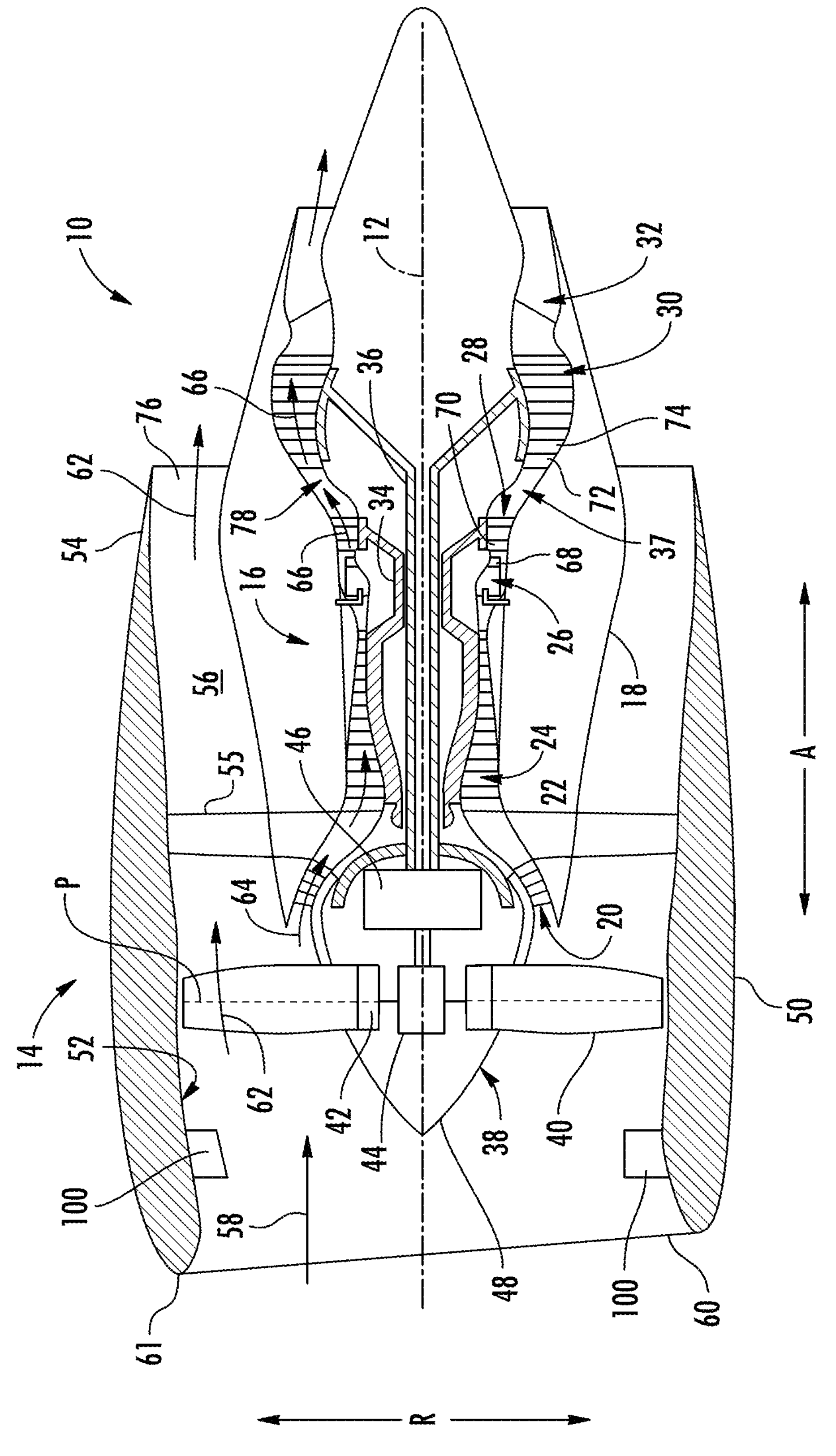
FIG. 1 is a cross-sectional view of an exemplary gas turbine engine.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

For the purposes of the description, the terms "upper," "lower," "right," "left," "vertical," "horizontal," "top," "bottom," "lateral," "longitudinal," and derivatives thereof shall relate to the disclosure as oriented in the drawings.

As may be used herein, the terms "first," "second," "third," and other ordinals are used to distinguish one component from another and are not intended to signify location or importance of the individual components.

The terms "forward" and "aft" refer to relative positions within a gas turbine engine, with "forward" referring to a position closer to an engine inlet and "aft" referring to a position closer to an engine nozzle or exhaust.

The terms "upstream" and "downstream" refer to the relative direction with respect to fluid flow in a fluid pathway. For example, "upstream" refers to the direction from which fluid flows, and "downstream" refers to the direction to which the fluid flows.

The term "attached" refers to two components that are in direct connection with each other. The term "integrated" means either two components that are formed simultaneously as a single piece or two components that are formed separately and then later fixed to each other. The term "unitary structure" means a single piece structure formed monolithically such that components of the unitary structure are formed simultaneously.

The singular forms "a", "an", and "the" include plural references unless the context clearly dictates otherwise.

The term "at least one of" in the context of, e.g., "at least one of A, B, and C" refers to only A, only B, only C, or any combination of A, B, and C.

The phrases "from X to Y" and "between X and Y" each refers to a range of values inclusive of the endpoints (i.e., refers to a range of values that includes both X and Y).

The present disclosure is generally related to an inlet pre-swirl feature configured as a plurality of guide vane assemblies for an inlet of a gas turbine engine and a control system in communication with components of the gas turbine engine.

The guide vane assemblies each include a forward vane and an aft vane. The forward vane is positioned at a fixed angle relative to a longitudinal axis of the gas turbine engine. The aft fan is movable between a range of angles relative to the longitudinal axis of the gas turbine engine. In other words, an angle of the aft vane can be varied during operation of the gas turbine engine.

The angle of the forward vane is fixed to provide rigidity for, e.g., deflecting incoming debris. The angle of the aft vane is variable in order to match the swirl imparted to an incoming air to the airspeed of the aircraft and the rotational speed of the fan such that the angular velocity of the air as it approaches the fan blade corresponds in a desired manner with the angular velocity of the fan blade. The aft vane is configured to pre-swirl the airflow provided through an inlet of the outer nacelle, upstream of the plurality of fan blades of the fan. As discussed herein, pre-swirling the airflow provided through the inlet of the outer nacelle prior to such airflow reaching the plurality of fan blades of the fan may reduce separation losses and/or shock losses, allowing the fan to operate with relatively high fan tip speeds with less losses in efficiency. Having fixed and variable portions of the guide vane assembly allows for rigid protection against incoming debris and pre-swirling of incoming air, improving operation of the gas turbine engine.

Referring now to the drawings, wherein identical numerals indicate the same elements throughout the figures, FIG. 1 is a cross-sectional view of a gas turbine engine in accordance with an exemplary embodiment of the present disclosure. More particularly, for the embodiment of FIG. 1, the gas turbine engine is an aeronautical, turbofan jet engine 10, referred to herein as "turbofan engine 10." The turbofan engine 10 is configured to be mounted to an aircraft, such as in an under-wing configuration or a tail-mounted configuration. As shown in FIG. 1, the turbofan engine 10 defines an axial direction A (extending parallel to a longitudinal centerline provided for reference), a radial direction R, and a circumferential direction (i.e., a direction extending about the axial direction A). The longitudinal centerline defines a longitudinal axis 12 of the turbofan engine 10. In general, the turbofan engine 10 includes a fan section 14 and a turbomachine 16 disposed downstream from the fan section 14 (the turbomachine 16 sometimes also, or alternatively, referred to as a "core turbine engine").

The exemplary turbomachine 16 depicted generally includes a substantially tubular outer casing 18 that defines an annular inlet 20. The outer casing 18 encases, in serial flow relationship, a compressor section including a first, booster or low pressure (LP) compressor 22 and a second, high pressure (HP) compressor 24; a combustion section 26; a turbine section including a first, high pressure (HP) turbine 28 and a second, low pressure (LP) turbine 30; and a jet exhaust nozzle section 32. A high pressure (HP) shaft drivingly connects the HP turbine 28 to the HP compressor 24. A low pressure (LP) shaft 36 drivingly connects the LP turbine 30 to the LP compressor 22. The compressor section, combustion section 26, turbine section, and jet exhaust nozzle section 32 are arranged in serial flow order and together define a core air flowpath 37 through the turbomachine 16. It is also contemplated that the present disclosure is compatible with an engine having an intermediate pressure turbine, e.g., an engine having three spools.

Referring still to the embodiment of FIG. 1, the fan section 14 includes a variable pitch, single stage fan 38, the turbomachine 16 operably coupled to the fan 38 for driving the fan 38. The fan 38 includes a plurality of rotatable fan blades 40 coupled to a disk 42 in a spaced apart manner. As depicted, the fan blades 40 extend outwardly from disk 42 generally along the radial direction R. Each fan blade 40 is rotatable relative to the disk 42 about a pitch axis P by virtue of the fan blades 40 being operatively coupled to a suitable actuation member 44 configured to collectively vary the pitch of the fan blades 40, e.g., in unison. The fan blades 40, disk 42, and actuation member 44 are together rotatable about the longitudinal centerline 12 by the LP shaft 36 across a power gear box 46. The power gear box 46 includes a plurality of gears for stepping down the rotational speed of the LP shaft 36 to a more efficient rotational fan speed. Accordingly, for the embodiment depicted, the turbomachine 16 is operably coupled to the fan 38 through the power gear box 46.

In exemplary embodiments, the fan section 14 includes twenty-two (22) or fewer fan blades 40. In other exemplary embodiments, the fan section 14 includes a different number of fan blades 40, such as twenty (20), eighteen (18), sixteen (16), or other numbers of fan blades 40.

Referring still to the exemplary embodiment of FIG. 1, the disk 42 is covered by a rotatable front nacelle or hub 48 aerodynamically contoured to promote an airflow through the plurality of fan blades 40. Additionally, the exemplary fan section 14 includes an annular fan casing or outer nacelle 50 that at least partially (and for the embodiment depicted, circumferentially) surrounds the fan 38 and at least a portion of the turbomachine 16.

More specifically, the outer nacelle 50 includes an inner wall 52 and a downstream section 54 of the inner wall 52 of the outer nacelle 50 extends over an outer portion of the turbomachine 16 so as to define a bypass airflow passage 56 therebetween. Additionally, for the embodiment depicted, the outer nacelle 50 is supported relative to the turbomachine 16 by a plurality of circumferentially spaced outlet guide vanes 55. The outer nacelle 50 includes an inlet 60 at a leading edge 61 of the outer nacelle 50.

During operation of the turbofan engine 10, a volume of air 58 enters the turbofan engine 10 through the inlet 60 of the outer nacelle 50 and/or the fan section 14. As the volume of air 58 passes cross the fan blades 40, a first portion of the air 58 as indicated by arrow 62 is directed or routed into the bypass airflow passage 56, and a second portion of the air 58 as indicated by arrow 64 is directed or routed into the core air flowpath 37. The pressure of the second portion of air indicated by the arrow 64 is then increased as it is routed through the HP compressor 24 and into the combustion section 26, where it is mixed with fuel and burned to provide combustion gases 66. The combustion gases 66 are routed from the combustion section 26 through the HP turbine 28. In the HP turbine 28, a portion of thermal and/or kinetic energy from the combustion gases 66 is extracted via sequential stages of HP turbine stator vanes 68 that are coupled to the outer casing 18 and HP turbine rotor blades 70 that are coupled to a high pressure (HP) shaft 34, thus causing the HP shaft 34 to rotate, thereby supporting operation of the HP compressor 24. The combustion gases 66 are then routed through the LP turbine 30 where a second portion of thermal and/or kinetic energy is extracted from the combustion gases 66 via sequential stages of LP turbine stator vanes 72 that are coupled to the outer casing 18 and LP turbine rotor blades 74 that are coupled to the LP shaft 36, thus causing the LP shaft 36 to rotate, thereby supporting operation of the LP compressor 22 and/or rotation of the fan 38.

The combustion gases 66 are subsequently routed through the jet exhaust nozzle section 32 of the turbomachine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan engine 10, also providing propulsive thrust. The HP turbine 28, the LP turbine 30, and the jet exhaust nozzle section 32 at least partially define a hot gas path 78 for routing the combustion gases 66 through the turbomachine 16.

Referring still to FIG. 1, the turbofan engine 10 of the present disclosure also provides pre-swirling flow forward of a tip of the fan blade 40 as described herein. For example, the turbofan engine 10 additional includes one or more inlet guide vane assemblies 100, as described in greater detail below.

In some exemplary embodiments, the exemplary turbofan engine 10 of the present disclosure may be a relatively large power class turbofan engine 10. Accordingly, when operated at the rated speed, the turbofan engine 10 may be configured to generate a relatively large amount of thrust. More specifically, when operated at the rated speed, the turbofan engine 10 may be configured to generate at least 20,000 pounds of thrust, such as at least about 25,000, 30,000, and up to, e.g., 150,000 pounds of thrust. Accordingly, the turbofan engine 10 may be referred to as a relatively large power class gas turbine engine.

Moreover, the exemplary turbofan engine 10 depicted in FIG. 1 is by way of example only, and that in other exemplary embodiments, the turbofan engine 10 may have any other suitable configuration. For example, in certain exemplary embodiments, the fan may not be a variable pitch fan, the engine may not include a reduction gearbox (e.g., the power gearbox 46) driving the fan, and may include any other suitable number or arrangement of shafts, spools, compressors, turbines, etc.

Figure 2:
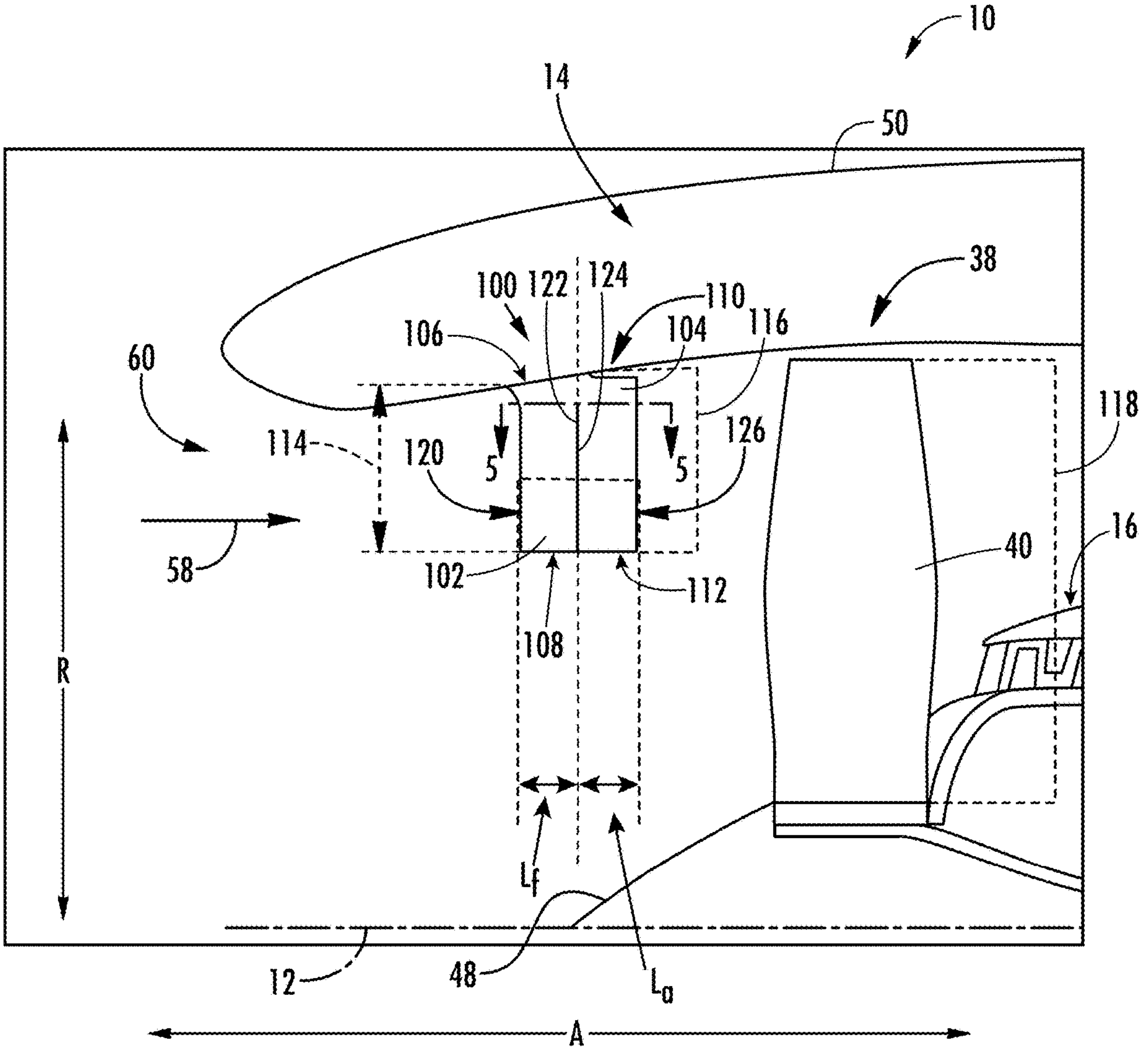
FIG. 2 is a magnified view of a forward end of the exemplary gas turbine engine of FIG. 1 illustrating a guide vane assembly.

Referring now also to FIG. 2, a magnified view of the fan section 14 and forward end of the turbomachine 16 is provided. A guide vane assembly 100 is located forward of the plurality of fan blades 40 in the axial direction A, i.e., upstream of the fan blades 40. The guide vane assembly 100 may be attached to or integrated into the outer nacelle 50, e.g., formed separately and later attached to each other or formed simultaneously as a unitary structure.

The guide vane assembly 100 includes a forward vane 102 and an aft vane 104. The forward vane 102 provides rigidity and debris protection to the guide vane assembly 100. Specifically, the forward vane 102 is configured to deflect objects and other debris entering the nacelle 50, and the forward vane 102 may be formed of a material with specified stiffness or modulus in order to deflect the objects while inhibiting deformation. The material of the forward vane 102 may have a higher stiffness or modulus than a material of the aft vane 104. For example, the forward vane 102 may be metal, such as steel or titanium, and the aft vane 104 may be a composite, such as a carbon fiber polymer. As another example, both the forward vane 102 and the aft vane 104 may be metals, or both may be composites, where the stiffness or modulus of the forward vane 102 is greater than the stiffness or modulus of the aft vane 104. When the guide vane assembly 100 is positioned in the nacelle 50, the forward vane 102 may be attached to or integrated with the nacelle 50.

Figure 5:
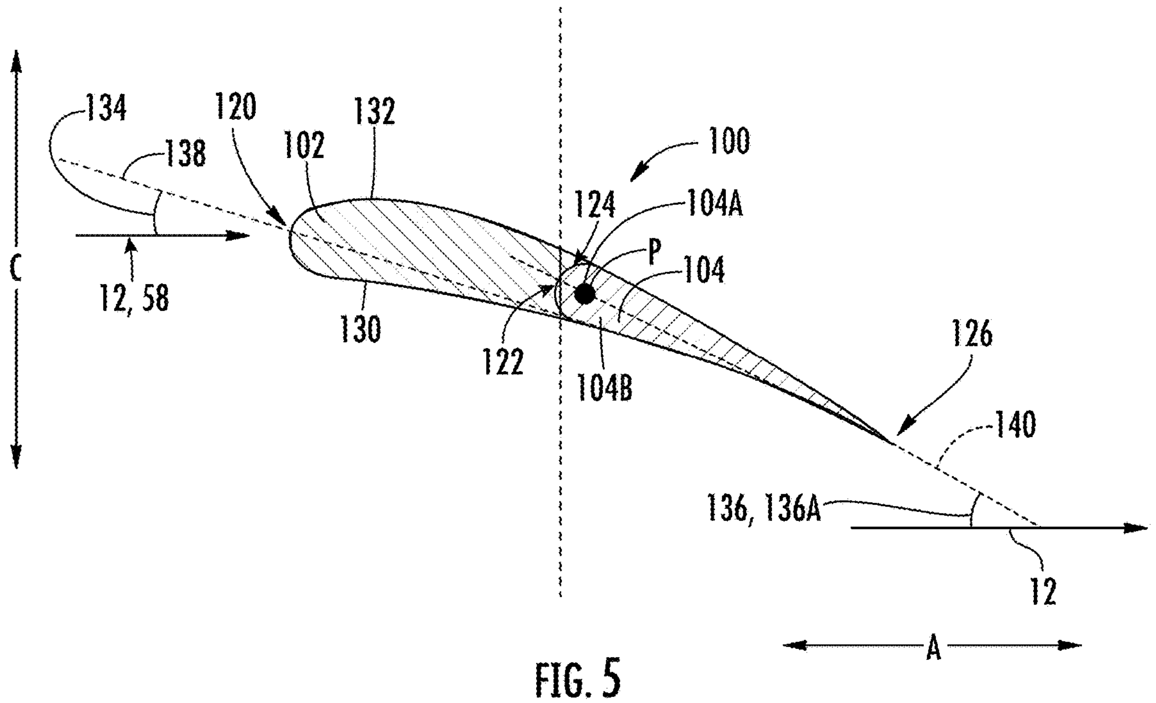
FIG. 5 is a cross-sectional view of the guide vane assembly of the exemplary gas turbine engine of FIG. 1 along the line 5-5 with an aft vane disposed at a first angle.
Figure 6:
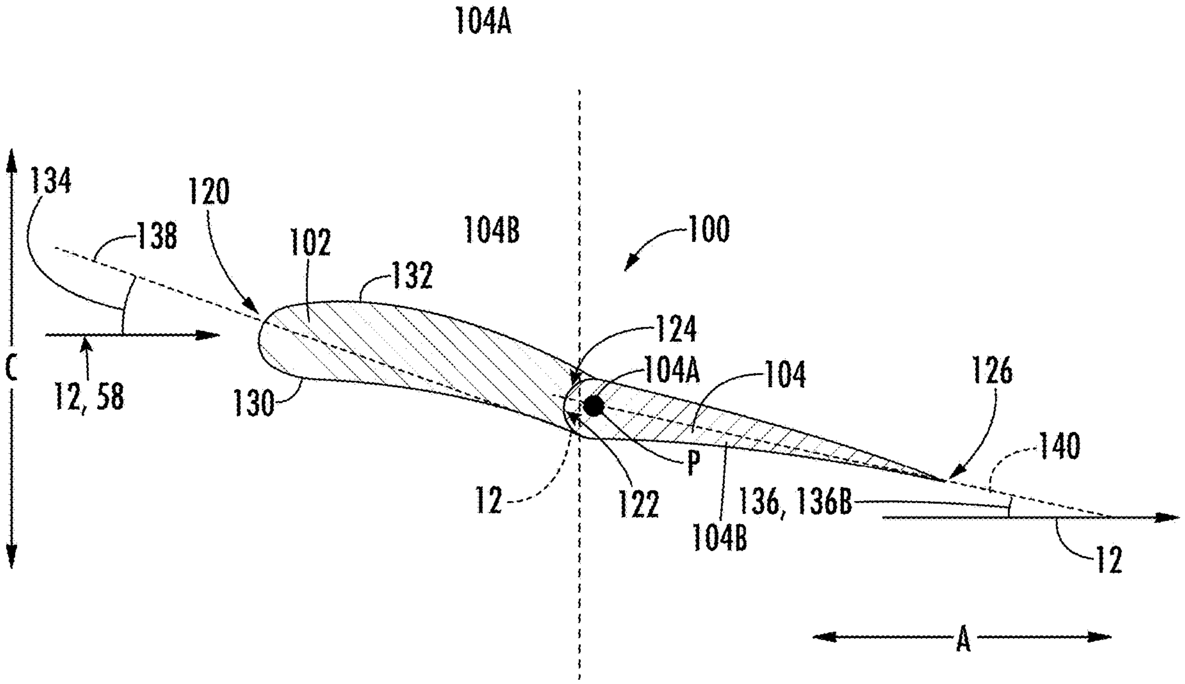
FIG. 6 is a cross-sectional view of the guide vane assembly of the exemplary gas turbine engine of FIG. 1 with the aft vane disposed at a second angle.

The aft vane 104 provides a swirl control feature to control swirl of air 58 flowing past the guide vane assembly 100 toward the fan blades 40. Specifically, as will be explained in greater detail below, the aft vane 104 is movable relative to the forward vane 102 in order to control air flow to the fan blades 40. The aft vane 104 is located aft of the forward vane 102 and forward of the fan blades 40. When the guide vane assembly 100 is positioned in the nacelle 50, at least a portion of the aft vane 104 is attached to or integrated with the nacelle 50. That is, while the aft vane 104 is generally movable relative to the forward vane 102, a portion of the aft vane 104 may be attached to or integrated with the nacelle 50 to secure the aft vane 104 in place. This fixed portion may be, e.g., a rod around which a movable portion of the aft vane 104 rotates (as shown in FIGS. 5-6 and described below), and the fixed portion may extend into the nacelle 50 to a suitable attachment point or may be integrated into the nacelle 50.

The forward vane 102 extends generally along the radial direction R from an outer end 106 to an inner end 108, and the aft vane 104 extends generally along the radial direction R from an outer end 110 to an inner end 112. A "span" of the forward vane 102 or the aft vane 104 is a length in the radial direction R from the outer end 106, 110 to the inner end 108, 112. The span of the forward vane 102 is a "forward vane span" 114, and the span of the aft vane is an "aft vane span" 116. The inner ends 108, 112 of the forward vane 102 and the aft vane 104 extend freely and do not include any intermediate connection members at the inner ends 108, 112, such as a connection ring, strut, or the like. More specifically, the forward vane 102 and the aft vane 104 are completely supported by a connection to the nacelle 50 at the outer ends 106, 110 and not through any structure extending, e.g., between adjacent guide vane assemblies 100. In this exemplary embodiment, the forward vane span 114 is less than the aft vane span 116, and it is appreciated that the larger of the forward vane span 114 and the aft vane span 116 can define a total span of the guide vane assembly 100, i.e., a "guide vane assembly span."

As will be appreciated, the plurality of fan blades 40 each define a fan blade span 118. In this exemplary embodiment, the forward vane span 114 and the aft vane span 116 (and thus the guide vane assembly span) are from 5% to 50% of the fan blade span, e.g., from 5% to 10%. In general, the guide vane assembly span may be expressed as a percentage of the fan blade span 118.

The forward vane 102 extends generally along the axial direction A from a leading edge 120 to a trailing edge 122, defining a "forward axial length," and the aft vane 104 extends generally along the axial direction A from a leading edge 124 to a trailing edge 126, defining an "aft axial length."

More specifically, the trailing edge 122 of the forward vane 102 abuts the leading edge 124 of the aft vane 104. Alternatively, the trailing edge 122 of the forward vane 102 may be spaced or separated from the leading edge 124 of the aft vane 104, defining a gap therebetween. In this embodiment, at a specific radial position within the nacelle 50, the forward vane 104 defines a forward axial length $L_f$ between the leading edge 120 and the trailing edge 122, and the aft vane 104 defines an aft axial length $L_a$ between the leading edge 124 and the trailing edge 126. In the exemplary embodiment depicted, the forward axial length $L_f$ and aft axial length $L_a$ are each measured at a common position along the radial direction R and are measured in the axial direction A. In particular, for the embodiment depicted, the forward axial length $L_f$ and aft axial length $L_a$ are each measured at a location along the radial direction R corresponding to a 50% span of the forward vane 102.

As part of the design of the guide vane assembly 100 of the present disclosure, the inventors of the present disclosure designed several iterations that would satisfy the design requirements identified. In particular, the inventors of the present disclosure designed several iterations that would be of a sufficient stiffness to withstand contact with debris, while having sufficient variability to provide desired aerodynamics benefits at various flight conditions. These iterations included inlet guide vanes of various spans relative to the fan blades. As part of these design iterations, the inventors of the present disclosure found a significant relationship between the forward axial length $L_f$ and aft axial length $L_a$ to meet these design requirements.

In particular, the inventors of the present disclosure found that as the guide vane assembly span increases, more debris contacts the forward vane 102 during flight operation and an increased forward axial length $L_f$ is generally required to inhibit damage to the forward vane 102. Such a configuration thereby increasing an overall stiffness of the guide vane assembly 100. As a result, the aft axial length $L_a$ may be decreased to maintain a constant axial length of the guide vane assembly 100, as shown in Table 1. That is, the aft axial length $L_a$ may be inversely related to the forward axial length $L_f$ as the guide vane assembly span increases.

In this exemplary embodiment, a ratio of the aft axial length $L_a$ to the forward axial length $L_f$ is from 0.2 to 5.0. More specifically, the guide vane assembly 100 is designed such that, based on the guide vane assembly span, the forward axial length $L_f$ and the aft axial length $L_a$ are determined such that the forward vane 102 provides debris protection while the aft vane 104 provides swirl control. Table 1 below shows example forward axial lengths $L_f$ and aft axial lengths $L_a$ for example guide vane assemblies 100 having specified guide vane assembly spans. Table 1 also shows a minimum aft axial length (i.e., $0.2L_f$) of the aft vane 104 and a maximum aft axial length (i.e., $5.0L_f$) of the aft vane 104 for this exemplary embodiment.

TABLE 1

Axial Lengths of Forward and Aft Vanes

| Guide Vane Assembly Span (% of fan blade span) | Forward Axial Length (inches) | Aft Axial Length (inches) | 0.2 $L_f$ | 5.0 $L_f$ |
|---|---|---|---|---|
| 5 | 1.00 | 4.00 | 0.20 | 5.00 |
| 10 | 1.33 | 3.67 | 0.27 | 6.67 |
| 15 | 1.67 | 3.33 | 0.33 | 8.33 |
| 20 | 2.00 | 3.00 | 0.40 | 10.00 |
| 25 | 2.33 | 2.67 | 0.41 | 11.67 |
| 30 | 2.67 | 2.33 | 0.53 | 13.33 |
| 35 | 3.00 | 2.00 | 0.60 | 15.00 |
| 40 | 3.33 | 1.67 | 0.67 | 16.67 |
| 45 | 3.67 | 1.33 | 0.73 | 18.33 |
| 50 | 4.00 | 1.00 | 0.80 | 20.00 |

Figure 3:
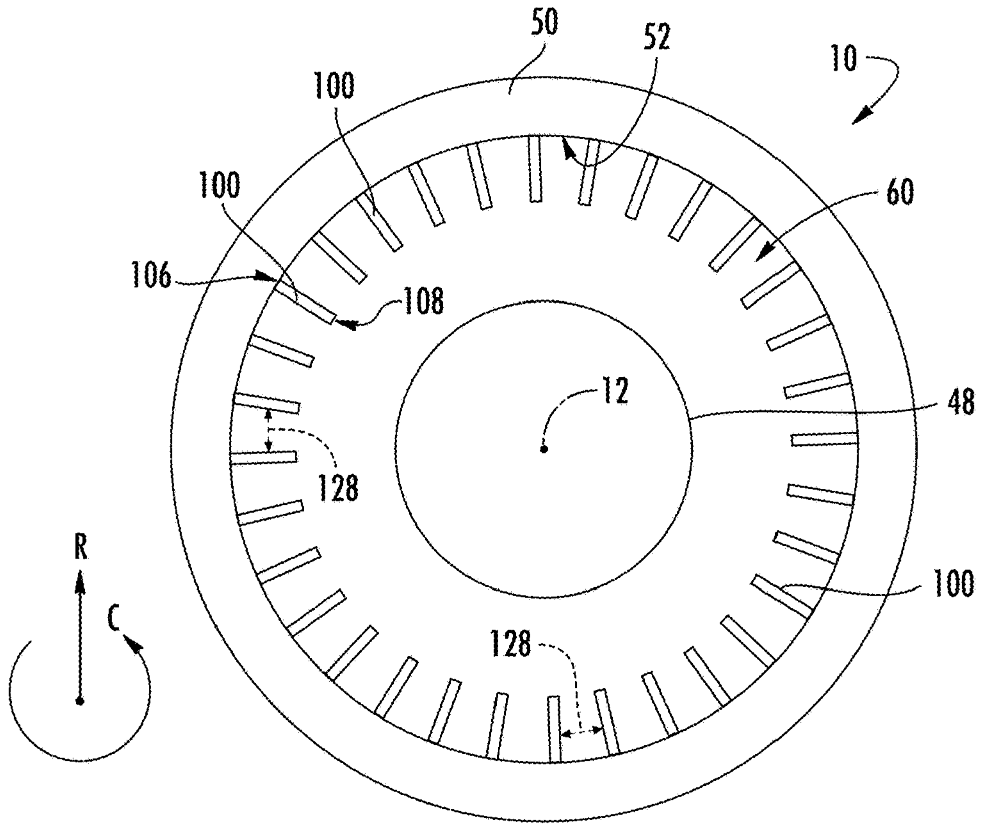
FIG. 3 is an axial view of an inlet to the exemplary gas turbine engine of FIG. 1 with a plurality of evenly-spaced guide vane assemblies.

As shown in FIG. 3, an axial view of the inlet 60 of the turbofan engine 10 is shown. In this embodiment, the plurality of guide vane assemblies 100 includes a relatively large number of guide vane assemblies 100 arranged circumferentially around the nacelle 50. More specifically, the plurality of guide vane assemblies 100 shown in FIG. 3 is from about ten guide vane assemblies 100 to about fifty guide vane assemblies 100. The plurality of guide vane assemblies 100 are arranged substantially evenly along a circumferential direction C. More specifically, each of the plurality of guide vane assemblies 100 defines a circumferential spacing 128 with an adjacent guide vane assembly 100, and each of the circumferential spacings 128 are substantially equal to each other of the circumferential spacings 128.

Figure 4:
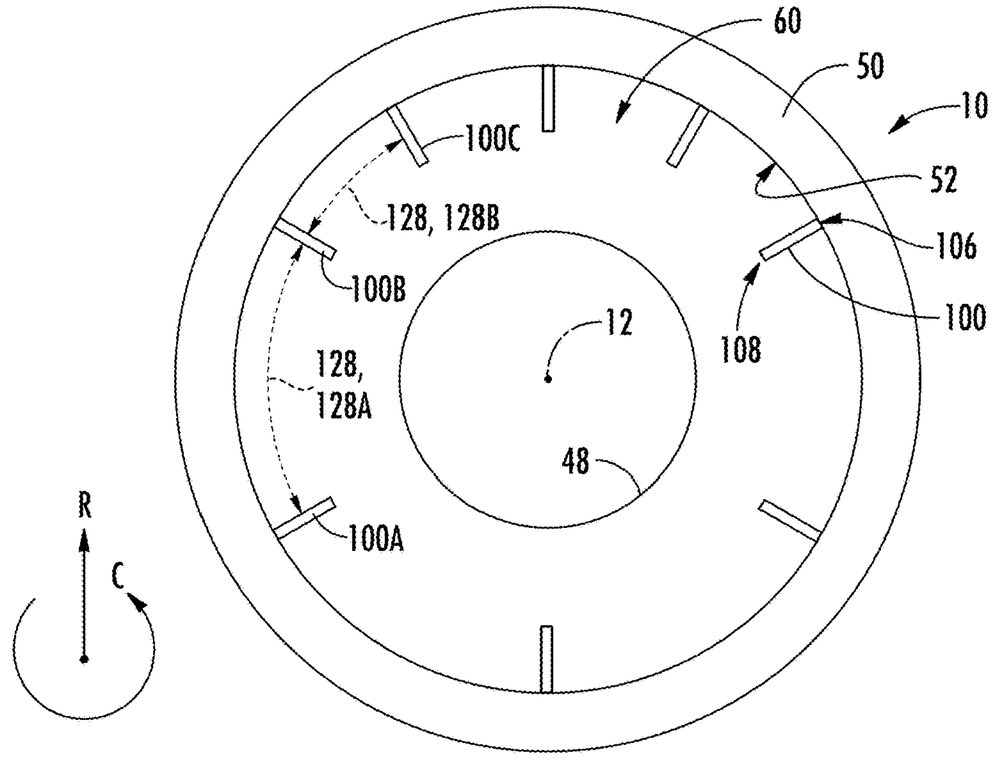
FIG. 4 is an axial view of an inlet to a gas turbine engine according to another exemplary embodiment with a plurality of unevenly-spaced guide vane assemblies.

Alternatively, as shown in FIG. 4, the circumferential spacings 128 between the guide vane assemblies 100 may differ. That is, at least one of the circumferential spacings 128 may differ from at least one of the other circumferential spacings 128. For example, a first circumferential spacing 128A defined between two adjacent guide vane assemblies 100A, 100B differs from a second circumferential spacing 128B between another two adjacent guide vane assemblies 100B, 100C. In this example, the first circumferential spacing 128A is at least about twenty percent greater than the second circumferential spacing 128B, such as at least about twenty-five percent greater and up to about two hundred percent greater. The non-uniform circumferential spacings 128 may, e.g., offset structure upstream of the guide vane assemblies 100.

Now referring to FIGS. 5-6, a cross-sectional view of a part span inlet guide vane of the guide vane assembly 100 of FIG. 2 is shown. As depicted, the guide vane assembly 100 is configured generally as an airfoil having a pressure side 130 and a suction side 132 and extending from the leading edge 120 of the forward vane 102 to the trailing edge 126 of the aft vane 104. For this exemplary embodiment, a direction of airflow 58 is substantially parallel to the axial direction A and the longitudinal axis 12 of the turbofan engine 10.

The forward and aft vanes 102, 104 define respective pitch angles 134, 136. In this context, a "pitch angle" is an angle defined between the longitudinal axis 12 of the turbofan engine 10 (FIG. 2), represented as the longitudinal centerline 12, and a chord extending from the leading edge 120, 124 to the trailing edge 122, 126 of the forward vane 102 or the aft vane 104. More specifically, a chord 138 for the forward vane 104 is defined between a forwardmost point of the forward vane 102 and the aftmost point of the forward vane 102, and a chord 140 for the aft vane 104 is defined between a forwardmost point of the aft vane 104 and an aftmost point of the aft vane 104. The pitch angle 134 of the forward vane 102 is fixed so that the rigidity of the forward vane 102 is increased, improving debris deflection of the forward vane 102. That is, by fixing the pitch angle 134 of the forward vane 102, the forward vane 102 may be fixed to the nacelle 50 more rigidly, increasing the stiffness of the forward vane 102.

The pitch angle 136 of the aft vane 104 is movable to provide controlled swirl of airflow 58 past the guide vane assembly 100. As described above, the aft vane 104 may include a fixed portion 104A such as a rod attached to or integrated with the nacelle 50 about which a movable portion 104B of the aft vane 104 rotates. The movable portion 104B is rotatable about a pitch axis P extending through the fixed portion 104A such that the aft vane 104 is movable between a first pitch angle 136A, such as the pitch angle 136 shown in FIG. 5, and a second pitch angle 136B, such as the pitch angle 136 shown in FIG. 6. By moving the aft vane 104 between different pitch angles 136, the aft vane 104 controls swirl of airflow 58 past the guide vane assembly 100, which may reduce turbulence of the airflow 58 and/or provide a specified amount of pre-swirl at the radially outward ends of the fan blades 40, where the speed of the fan blades 40 (FIG. 2) is greatest, to provide a desired reduction in flow separation and/or shock losses that may otherwise occur due to a relatively high speed of the plurality of fan blades 40 at the fan tips during operation of the turbofan engine 10. In the exemplary embodiment of FIGS. 5-6, the aft vane 104 is movable between a minimum pitch angle of 5 degrees to a maximum pitch angle of 35 degrees.

The specific pitch angle 136 of the aft vane 104 may be determined to match the swirl imparted to the incoming airflow 58 to the airspeed of the aircraft and the rotational speed of the fan 38 (FIG. 2) such that the angular velocity of the air as it approaches the fan blade 40 corresponds as closely as possible with the angular velocity of the fan blade 40. This minimizes the potential of the fan 38 to surge or stall. The faster the fan 38 rotates, the more swirl that needs to be imparted by the guide vane assemblies 100. As the airspeed of the aircraft increases, the time that it takes for the incoming air to pass from the guide vane assemblies 100 to the leading edge of the fan 38 decreases, and as such the necessary amount of swirl decreases proportionately. As such the maximum imparted swirl is required when the turbofan engine 10 is at maximum thrust with a stationary aircraft, just prior to beginning a takeoff roll.

Figure 7:
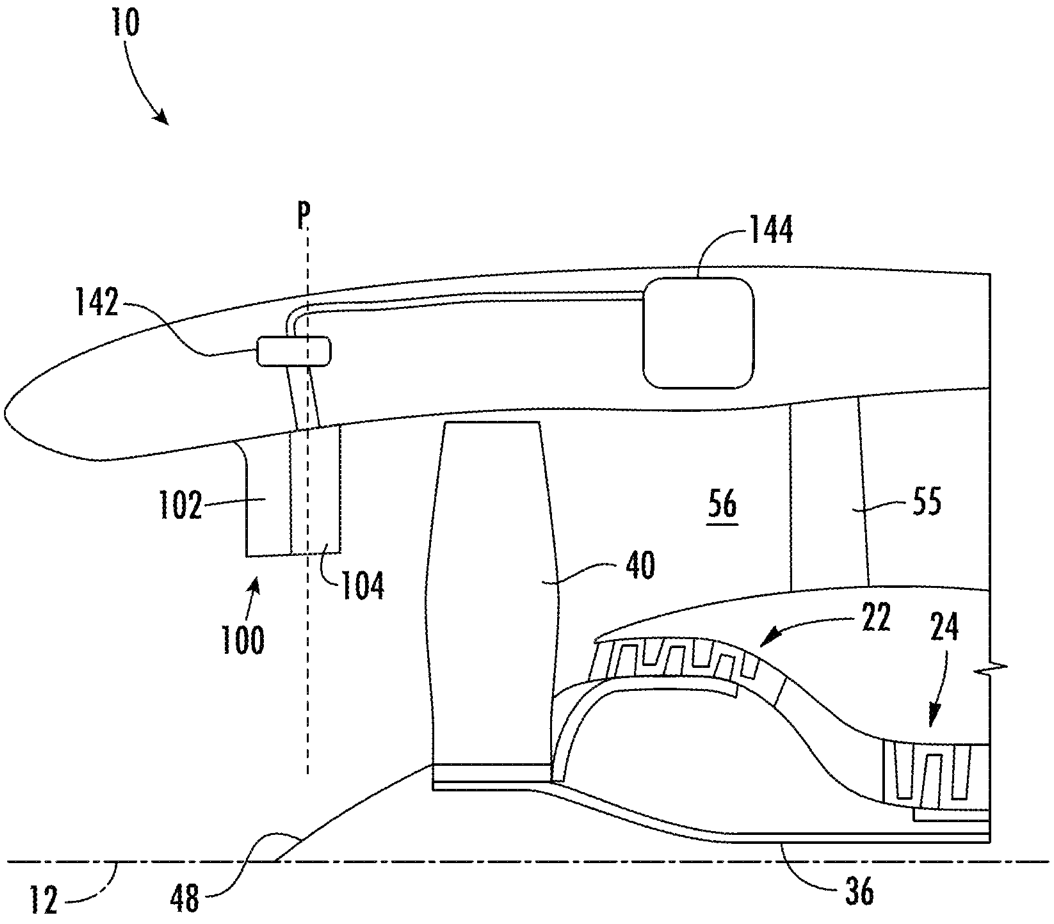
FIG. 7 is a magnified view of the exemplary gas turbine engine of FIG. 1 illustrating a variable pitch mechanism.

Now referring to FIG. 7, a magnified view of the turbofan engine 10 is shown. The turbofan engine 10 may include a variable pitch mechanism 142 that is operably coupled to the aft vane 104. The variable pitch mechanism 142 is configured to move the aft vane 104 about the pitch axis P to a specified pitch angle 136, e.g., from the first angle 136A to the second angle 136B shown in FIGS. 5-6. It is contemplated that the variable pitch mechanism 142 may include, for example, a stepper motor, a torque motor, or a similar drive component. A controller 144 communicates with and actuates the variable pitch mechanism 142 to move the aft vane 104. The controller 144 includes a processor and a memory, and the processor is configured to determine when to change the pitch angle 136 of the aft vane 104 based on data from one or more sensors (not shown), such as crosswind sensors, pressure sensors, blade passing sensors, temperature sensors, or the like. The processor then actuates the variable pitch mechanism 142 to move the aft vane 104 to a specified pitch angle 136.

Further aspects are provided by the subject matter of the following clauses:

A guide vane assembly for a nacelle of a gas turbine engine, the gas turbine engine defining a longitudinal axis and an axial direction, the nacelle circumferentially surrounding a plurality of fan blades of the gas turbine engine, includes a forward vane and an aft vane located aft of the forward vane and forward of the plurality of fan blades when the guide vane assembly is positioned in the nacelle of the gas turbine engine, the forward vane defining a fixed pitch angle and the aft vane being movable between a first angle with respect to the longitudinal axis and a second angle with respect to the longitudinal axis when the guide vane assembly is positioned in the nacelle of the gas turbine engine.

The guide vane assembly of any of the preceding clauses, wherein the forward vane defines a forward axial length at a radial position, wherein the aft vane defines an aft axial length at the radial position, wherein a ratio of the aft axial length to the forward axial length is from 0.2 to 5.0.

The guide vane assembly of any of the preceding clauses, wherein the axial length of the aft vane is based on a span of the forward vane.

The guide vane assembly of any of the preceding clauses, wherein a trailing edge of the forward vane abuts a leading edge of the aft vane.

The guide vane assembly of any of the preceding clauses, wherein the forward vane defines a forward vane span, wherein the plurality of fan blades each defines a fan blade span, and wherein the forward vane span is between 5% and 50% of the fan blade span of the plurality of fan blades.

The guide vane assembly of any of the preceding clauses, wherein the forward vane span of the forward vane is from 5% to 10% of the fan blade span of the plurality of fan blades.

The guide vane assembly of any of the preceding clauses, wherein the forward vane comprises a first material, wherein the aft vane comprises a second material, and wherein the first material has a higher stiffness than the second material.

The guide vane assembly of any of the preceding clauses, wherein the forward vane is configured to deflect objects entering the nacelle.

The guide vane assembly of any of the preceding clauses, wherein the forward vane and the aft vane are each attached to or integrated with the nacelle when the guide vane assembly is positioned in the nacelle of the gas turbine engine.

The guide vane assembly of any of the preceding clauses, wherein the forward vane is fixed to a specified angle with respect to the longitudinal axis of the nacelle when the guide vane assembly is positioned in the nacelle of the gas turbine engine.

The guide vane assembly of any of the preceding clauses, wherein the first and second angles are between 5 degrees and 35 degrees.

The guide vane assembly of any of the preceding clauses, further including a variable pitch mechanism operably coupled to the aft vane configured to move the aft vane from the first angle to the second angle.

The guide vane assembly of any of the preceding clauses, wherein a forward vane span of the forward vane is less than an aft vane span of the aft vane.

A turbofan engine defining a longitudinal axis and an axial direction includes a fan including a plurality of fan blades, a turbomachine operably coupled to the fan and configured to drive the fan, a nacelle surrounding and at least partially enclosing the fan, and a guide vane assembly located forward of the plurality of fan blades in the axial direction, the guide vane assembly including a forward vane and an aft vane located aft of the forward vane and forward of the plurality of fan blades when the guide vane assembly is positioned in the nacelle of the gas turbine engine, the forward vane defining a fixed pitch angle and the aft vane being movable between a first angle with respect to the longitudinal axis and a second angle with respect to the longitudinal axis when the guide vane assembly is positioned in the nacelle of the turbofan engine.

The turbofan engine of any of the preceding clauses, wherein the guide vane assembly is attached to or integrated with the nacelle.

The turbofan engine of any of the preceding clauses, further including a plurality of guide vane assemblies disposed circumferentially around the nacelle.

The turbofan engine of any of the preceding clauses, wherein the plurality of guide vane assemblies define a circumferential spacing between each adjacent pair of the plurality of guide vane assemblies.

The turbofan engine of any of the preceding clauses, wherein the circumferential spacing between each adjacent pair of the plurality of guide vane assemblies is equal.

The turbofan engine of any of the preceding clauses, wherein the circumferential spacing between at least one adjacent pair of the plurality of guide vane assemblies is different than the circumferential spacing of at least one other adjacent pair of the plurality of guide vane assemblies.

The turbofan engine of any of the preceding clauses, wherein the circumferential spacing between each adjacent pair of the plurality of guide vane assemblies is different from the circumferential spacing of each other adjacent pair of the plurality of guide vane assemblies.

The turbofan engine of any of the preceding clauses, wherein the forward vane defines a forward axial length at a radial position, wherein the aft vane defines an aft axial length at the radial position, wherein a ratio of the aft axial length to the forward axial length is from 0.2 to 5.0.

The turbofan engine of any of the preceding clauses, wherein the aft axial length is based on a span of the forward vane.

The turbofan engine of any of the preceding clauses, wherein the span of the forward vane is from 5% to 50% of a span of the plurality of fan blades.

The turbofan engine of any of the preceding clauses, further including a variable pitch mechanism operably coupled to the aft vane configured to move the aft vane from the first angle to the second angle.

The turbofan engine of any of the preceding clauses, further including a controller in communication with the variable pitch mechanism and configured to actuate the variable pitch mechanism to move the aft vane.

The turbofan engine of any of the preceding clauses, wherein the forward vane is fixed to a specified pitch angle when the guide vane assembly is positioned in the nacelle of the turbofan engine.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

We claim:

1. A guide vane assembly for a nacelle of a gas turbine engine, the gas turbine engine defining a longitudinal axis and an axial direction, the nacelle circumferentially surrounding a plurality of fan blades of the gas turbine engine, the guide vane assembly comprising:

a forward vane; and an aft vane located aft of the forward vane and forward of the plurality of fan blades when the guide vane assembly is positioned in the nacelle of the gas turbine engine, the forward vane defining a fixed pitch angle and the aft vane being movable between a first pitch angle and a second pitch angle when the guide vane assembly is positioned in the nacelle of the gas turbine engine;

wherein the forward vane defines a forward vane span, wherein the plurality of fan blades each defines a fan blade span, and wherein the forward vane span is from 5% to 50% of the fan blade span of the plurality of fan blades;

wherein the forward vane defines a forward axial length at a radial position, wherein the aft vane defines an aft axial length at the radial position, wherein a ratio of the aft axial length to the forward axial length is from 0.2 to 5.0.

2. The guide vane assembly of claim 1, wherein a trailing edge of the forward vane abuts a leading edge of the aft vane.

3. The guide vane assembly of claim 1, wherein the forward vane span is from 5% to 10% of the fan blade span.

4. The guide vane assembly of claim 1, wherein the forward vane comprises a first material, wherein the aft vane comprises a second material, and wherein the first material has a higher stiffness than the second material.

5. The guide vane assembly of claim 1, wherein the forward vane is configured to deflect objects entering the nacelle.

6. The guide vane assembly of claim 1, wherein the forward vane and the aft vane are each attached to or integrated with the nacelle when the guide vane assembly is positioned in the nacelle of the gas turbine engine.

7. The guide vane assembly of claim 1, wherein the forward vane is fixed to a specified pitch angle when the guide vane assembly is positioned in the nacelle of the gas turbine engine.

8. The guide vane assembly of claim 1, wherein the first and second pitch angles are from 5 degrees to 35 degrees.

9. The guide vane assembly of claim 1, further comprising:

a variable pitch mechanism operably coupled to the aft vane and configured to move the aft vane from the first pitch angle to the second pitch angle.

10. A turbofan engine defining a longitudinal axis and an axial direction, the turbofan engine comprising:

a fan comprising a plurality of fan blades;

a turbomachine operably coupled to the fan and configured to drive the fan;

a nacelle surrounding and at least partially enclosing the fan; and a guide vane assembly located forward of the plurality of fan blades in the axial direction, the guide vane assembly including a forward vane and an aft vane located aft of the forward vane and forward of the plurality of fan blades when the guide vane assembly is positioned in the nacelle of the gas turbine engine, the forward vane defining a fixed pitch angle and the aft vane being movable between a first pitch angle and a second pitch angle when the guide vane assembly is positioned in the nacelle of the turbofan engine, wherein the forward vane defines a forward vane span, wherein the plurality of fan blades each defines a fan blade span, and wherein the forward vane span is from 5% to 50% of the fan blade span of the plurality of fan blades;

wherein the forward vane defines a forward axial length at a radial position, wherein the aft vane defines an aft axial length at the radial position, wherein a ratio of the aft axial length to the forward axial length is from 0.2 to 5.0.

11. The turbofan engine of claim 10, wherein the guide vane assembly is attached to or integrated with the nacelle.

12. The turbofan engine of claim 10, further comprising:

a plurality of guide vane assemblies disposed circumferentially around the nacelle.

13. The turbofan engine of claim 10, further comprising:

a variable pitch mechanism operably coupled to the aft vane and configured to move the aft vane from the first pitch angle to the second pitch angle.

14. The turbofan engine of claim 10, wherein the forward vane comprises a first material, wherein the aft vane comprises a second material, and wherein the first material has a higher stiffness than the second material.

* * * * *